United States Patent
Tako et al.

(10) Patent No.: US 6,485,581 B2
(45) Date of Patent: Nov. 26, 2002

(54) BEARING FOR MAIN SPINDLE OF MACHINE TOOL

(75) Inventors: Hiroshi Tako, Shizuoka-ken (JP); Mamoru Mizutani, Osaka-fu (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/969,880

(22) Filed: Oct. 4, 2001

(65) Prior Publication Data

US 2002/0066502 A1 Jun. 6, 2002

(30) Foreign Application Priority Data

Oct. 6, 2000 (JP) .................................. 2000-307925

(51) Int. Cl.[7] ................................................. C23C 8/26
(52) U.S. Cl. ....................................................... 148/318
(58) Field of Search .......................................... 148/318

(56) References Cited

U.S. PATENT DOCUMENTS

| 4,459,164 A | * | 7/1984 | Yoshioka et al. | ........... | 148/508 |
| 5,403,545 A | * | 4/1995 | Takata et al. | ............... | 420/112 |
| 5,427,457 A | * | 6/1995 | Furumura et al. | .......... | 384/450 |
| 5,725,690 A | * | 3/1998 | Ochi et al. | .................. | 148/320 |
| 6,158,263 A | * | 12/2000 | Maeda et al. | ............... | 148/906 |

FOREIGN PATENT DOCUMENTS

| JP | 08311615 A | * | 11/1996 | ........... | C22C/38/00 |

OTHER PUBLICATIONS

"Induction Hardening", http://www.jp/com.au/Hardening.html, printed Jul. 19, 2002.*

* cited by examiner

*Primary Examiner*—Roy King
*Assistant Examiner*—Tima McGuthry-Banks
(74) *Attorney, Agent, or Firm*—Arent Fox Kintner Plotkin & Kahn, PLLC

(57) ABSTRACT

A bearing for use in the main spindle of a machine tool is provide, in which at least the raceway of the bearing contains by mass, C: 0.6–1.3%, Si: 0.3—3.0%, Mn: 0.2–.5%, P: 0.03% or less, S: 0.03% or less, Cr: 0.3–5.0%, Ni: 0.1–3.0%, Al: 0.050% or less, Ti: 0.003% or less, O: 0.0015% or less, N: 0.015% or less; and the rest is composed of Fe and unavoidable impurities. The raceway is tempered after either quenching or carbonitriding and its surface hardness presents at least HRC 58 after tempering.

12 Claims, 5 Drawing Sheets

BEARING FOR MAIN SPINDLE OF MACHINE TOOL

BACKGROUND OF THE INVENTION

1. Field of the Invention

The present invention relates to a rolling bearing holding a main spindle of a machine tool.

2. Description of the Related Art

A main spindle of a machine tool is required to rotate with high precision and small increase in temperature for maintaining high working accuracy. High precision and a small increase in temperature during rotation are also required for a bearing supporting the main spindle. To meet these requirements, a small amount of grease and a slight amount of oil (oil mist or air oil) are employed in bearings for lubrication.

A small temperature rise in bearings for use in the main spindle of the machine tool must be maintained to prevent a degradation in working accuracy caused by the thermal deformation of the main spindle. Thus such bearings are used in the demanding condition of high-speed rotation with a small amount of lubricant oil. Under such a harsh condition, roughness and wear on the raceway caused by a slight shortage of oil film, damage such as peeling and smearing, and a shortened lifetime caused by seizing may be problems. A shortage of oil film thickness can be caused by, for example, an entry into the bearing of cutting oil or chippings of the workpiece, an increase in the working load, and heat generation in the motor. Roughness and wear in the raceway may cause noise during use and degradation in the rotation accuracy of the main spindle. As the rotation speed of the main spindle is expected to further rise in the future, it is very important to prevent the damage described above.

SUMMARY OF THE INVENTION

It is, therefore, an object of the present invention to provide a bearing that has an excellent durability and an excellent surface damage resistance when used in the main spindle of a machine tool.

In the bearing for use in a main spindle of a machine tool according to a first aspect of the present invention, at least its raceway is made of steel containing by mass, C (carbon): no less than 0.6% and not more than 1.3%; Si (silicon): no less than 0.3% and not more than 3.0%; Mn (manganese): no less than 0.2% and not more than 1.5%; P: at or less than 0.03%; S (sulfur): at or less than 0.03%; Cr (chrome): no less than 0.3% and not more than 5.0%; Ni (nickel): no less than 0.1% and not more than 3.0%; Al (aluminum): at or less than 0.050%; Ti (titanium): at or less than 0.003%; O (oxygen): at or less than 0.0015%; N (nitrogen): at or less than 0.015%; and the rest is composed of Fe (iron) and unavoidable impurities. The raceway is tempered after either quenching or carbonitriding and its surface hardness presents at least HRC (Hardness of Rockwell C-scale) 58 after tempering.

The steel of the above composition, if it is quenched and tempered, has an excellent rolling fatigue resistance even with no carbonitriding. Thus it is possible to omit the carbonitriding process and thereby reduce the manufacturing cost thereof. Although it is preferable to omit carbonitriding process in terms of a reduction in the manufacturing cost, an excellent rolling fatigue resistance can be attained by applying carbonitriding instead of quenching.

Besides, the steel of the above composition is cheaper than precipitation hardening bearing steel such as M50.

A correlation is recognized between the surface hardness of bearing components made of the steel of the above composition and rolling fatigue life: higher surface hardness is likely to provide longer rolling fatigue life. Thus the rolling fatigue life is extended in the invention by making the surface hardness HRC 58 or higher. If the surface hardness is less than HRC 58, the rolling fatigue life tends to become significantly shorter, and fluctuations in useful life increase.

The improvements disclosed in this invention provide an inexpensive and highly rolling fatigue-resistant bearing for use in the main spindle of a machine tool. The bearing for use in the main spindle of a machine tool may be an angular contact ball bearing or a cylindrical roller bearing.

The following is an explanation of the preferable range of each component contained in the steel according to the present invention. The term "%" as used herein means percentage by mass, unless indicated otherwise.

C: 0.6 to 1.3%

Carbon is a component essential for ensuring a strength high enough for roller bearings. In this invention, the percentage of carbon content is at least 0.6% in order to attain a predetermined hardness after heat treatment. Carbides play an important role in extending rolling fatigue life; however, it has been found that large particles of carbide are generated and then shorten the rolling fatigue life if the percentage of carbon content exceeds 1.3%. The upper limit of carbon content is, therefore, determined as 1.3%.

Si: 0.3 to 3.0%

It is preferable to add silicon because Si prevents softening at high temperatures and improves the heat resistance of bearings. The lower limit of the percentage of silicon content is determined as 0.3% because such effects do not appear if Si content is less than 0.3%. The heat-resistance of bearings is increased as Si content increases; however, if the Si content exceeds 3.0%, the effect of silicon addition reaches a maximum and workability at high temperatures and machinability decreases. Therefore, the upper limit of the silicon content is determined as 3.0%.

Mn: 0.2 to 1.5%

Manganese is an element used for deoxidation of steel and the improvement of quenching properties. Since at least 0.2% of Mn addition is required to attain such effects, the lower limit of the Mn content is determined as 0.2%. On the other hand, if more than 1.5% of Mn is contained in steel, its machinability decreases significantly. Thus the upper limit of Mn content is determined as 1.5%.

P: 0.03% or less

Phosphorus segregates in an austenite grain boundary and thereby decreases the toughness and rolling fatigue life of steel. Therefore, its content is limited to 0.03%.

S: 0.03% or less

Sulfur harms the hot working ability of steel, and decreases the toughness and rolling fatigue life of steel, forming non-metallic inclusions. Its upper limit is, therefore, determined as 0.03%. It is preferable to make the S content as low as possible since sulfur exerts such negative effects on steel. However, since sulfur has the effect of improving machinability, sulfur may be included at up to 0.05%.

Cr: 0.3 to 5.0%

Chrome is an element which plays an important part in the present invention. This element is added to steel to improve its quenching properties, increase hardness by forming carbides and extend useful life. Since steel has to contain Cr at a level of at least 0.3% to provide a predetermined amount of carbide, the lower limit of Cr content is determined at 0.3%. On the other hand, if its content exceeds 5.0%, large carbides are generated and then rolling fatigue life is shortened. The upper limit of Cr content is, therefore, limited to 5.0%.

Ni: 0.1 to 3.0%

Nickel is also an important element in this invention, preventing the change in texture during rolling fatigue at high temperatures and the decrease in hardness at high temperatures, thereby extending the rolling fatigue life of the bearing. In addition, the addition of Ni leads to higher toughness and longer life under the existence of foreign substances as well as an improvement in the corrosion-resistance. Since steel has to contain Ni at a level of at least 0.1% to attain these effects, the lower limit of Ni content is determined as 0.1%. However, if the Ni content exceeds 3.0%, a large amount of austenite remains in the steel after quenching and the predetermined hardness cannot be attained. Besides, the cost of steel rises with the addition of Ni. Thus the upper limit of Ni content is determined as 3.0%.

Al: 0.050% or less

Aluminum is used as a deoxidizer during steel manufacturing. Since Al forms oxide inclusions with a high hardness and shortens the rolling fatigue life, Al content should be reduced as much as possible. Also if Al content exceeds 0.050%, the rolling fatigue life of the bearing is significantly shortened. Therefore, the upper limit of the Al content is determined as 0.050%. When trying to reduce the Al content to less than 0.005%, the steel manufacturing cost increases. Thus the lower limit of the Al content should be 0.005%.

Ti: 0.003% or less
O: 0.0015% or less
N: 0.015% or less

Titanium, oxygen and nitrogen form oxides and nitrides in steel. Because such oxides and nitrides become non-metallic inclusions in steel working as initiation points of fatigue destruction and thereby shorten rolling fatigue life, their upper limits are determined as 0.03% for Ti, 0.0015% for O and 0.015% for N.

As a result of the effects of the addition of these alloying elements, the softening of the surface of the steel is prevented even during a localized significant temperature rise due to sliding, for example. Then the surface damage resistance of the steel is improved and its rolling fatigue life is extended.

According to a second aspect of the present invention, the steel further contains at least either 0.05 to less than 0.25% by mass of Mo or 0.05–1.0% by mass of V. Then the rolling fatigue resistance and surface damage resistance can be further enhanced.

Now the preferred levels of Mo and V contents will be described below.

Mo: 0.05 to less than 0.25%

Molybdenum improves the quenching properties of steel and prevents softening during tempering by forming a solid solution of carbides. Molybdenum is added to steel particularly because it extends the rolling fatigue life of steel at high temperatures. However, if the Mo content becomes 0.25% or higher, the steel cost rises and its machinability is significantly reduced because the hardness of steel does not decrease when a softening treatment is conducted for easy machining. Mo content is, therefore, limited to less than 0.25%. On the other hand, since a Mo addition of less than 0.05% has no effect on the carbide formation, the lower limit of Mo content is determined as 0.05%.

V: 0.05 to 1.0%

Vanadium produces fine particles of carbide, combining with carbon, and thereby contributes to the formation of fine crystals that lead to a higher strength and toughness of steel. At the same time, vanadium improves the heat resistance of steel, prevents softening after high-temperature tempering, extends rolling fatigue life and reduces the fluctuations in life. Since these effects are obtained when the V content is 0.05% or higher, the lower limit of the V content is determined as 0.05%. However, if the V content exceeds 1.0%, the machinability and hot working ability of steel decrease. Therefore, the upper limit of the V content is determined as 1.0%.

Even if a high-temperature tempering is conducted on the bearing, assuming that the bearing is heated up to high temperatures, its surface hardness becomes HRC 58 or higher as a result of the addition of these elements. Then surface damage such as peeling and smearing can be successfully prevented.

In the roller bearing according to a third aspect of the present invention, wherein the raceway has a carbonitrided surface layer containing at least 10% by volume of residual austenite. The steel of the above composition provides a surface hardness of HRC 58 or higher even if the steel is tempered at high temperatures, for example 350° C. Such high-temperature tempering reduces the amount of residual austenite and thus provides excellent dimensional stability at high temperatures, while providing a hardness at least HRC 58. As a result, the rolling fatigue life and wear-resistance of the steel at high temperatures can be improved.

It is also possible to further improve the peeling resistance and durability by forming a carbonitrided layer which contains residual austenite at a level of at least 10% by volume on the surface of the bearing components made of the steel of the above composition. This is because such a treatment provides a high degree of surface toughness and thereby prevents the occurrence of cracks and their evolution. Namely, when the N content in the surface layer is raised by carbonitriding, an Ms point (initiation temperature of martensite transformation) of the surface layer is lowered. Then a large amount of austenite remains in the surface layer not transformed into martensite during quenching. Residual austenite has a high toughness and hardens by working, contributing to the prevention of crack generation and its evolution. In a surface layer having a low Ms point, the martensite transformation starts later than in the inside and the amount of martensite transformation becomes larger than in the inside. Then a compressive residual stress exits in the surface layer and the fatigue resistance of the surface layer is improved. As a result, peeling resistance is raised and the roller life is extended. In order to attain such effects, at least 10% by volume of residual austenite is needed in the surface carbonitrided layer. Addition of nitrogen by carbonitriding is also effective for providing a higher heat resistance and smearing resistance.

Temper toughness is referred to below. Bearings used at high temperatures are typically given the tempering treatment at a temperature higher than the temperature during operation in order to stabilize their dimensions during use. A detailed investigation into the relationship between rolling fatigue life at an operation temperature of 200° C. and tempering hardness indicates that the rolling fatigue life of steel is likely to extend as tempering hardness is raised. Particularly, even if tempering hardness is the same, steel that has been tempered at a higher temperature has a longer life. Bearings having greater hardness after tempering at a high temperature have longer lives. Also found is that if the post-tempering hardness becomes less than HRC 58, roller life is significantly shortened and fluctuations in life increase. In order to extend the life at high temperatures and reduce fluctuations in life, it is necessary to maintain hardness at HRC 58 or higher and at the same time it is preferable to raise the tempering temperature as high as possible. For example, the tempering temperature may preferably be at least 180° C. and not more than 350° C. Since rolling bearings are typically used at temperatures around 100° C. the tempering temperature should be at least 180° C.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Figure 1:
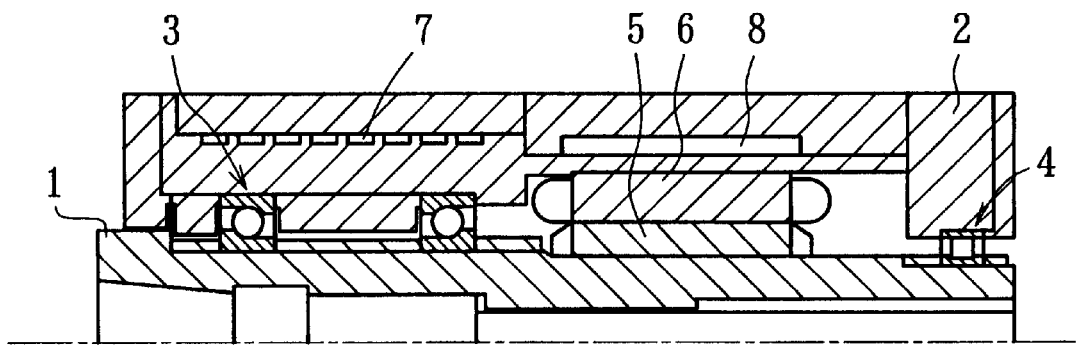
FIG. 1 is a view of a vertically sectioned main spindle of a machine tool.

FIG. 1 illustrates the structure of a typical machine tool main spindle. The main spindle 1 can move with no restriction for rotation in a housing 2, supported by an angular contact ball bearing 3 and a cylindrical roller bearing 4. A rotor 5 and a stator 6 constitute a motor that turns the main spindle 1. The rotor 5 is fixed on the main spindle 1, while the stator 6 is fixed on the housing 2. A bearing cooler jacket is denoted by reference numeral 7 and a motor cooler jacket is denoted by reference numeral 8.

Figures 2A, 2B, 2C:
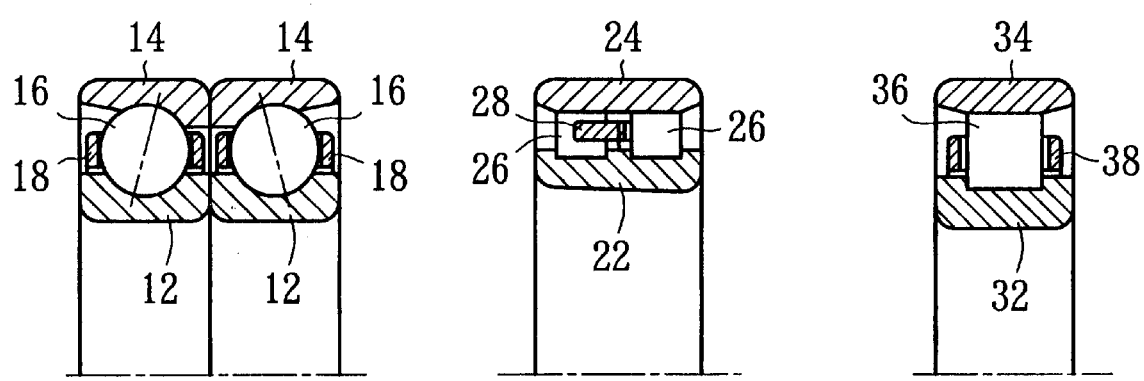
FIG. 2A is a sectional view of an angular contact ball bearing.
FIG. 2B is a sectional view of a double row cylindrical roller bearing.
FIG. 2C is a sectional view of a single row cylindrical roller bearing.

FIG. 2 illustrates a typical bearing that supports the main spindle 1. FIG. 2A shows the angular contact ball bearings facing each other on their backsides, FIG. 2B shows a double row cylindrical roller bearing and FIG. 2C shows a single row cylindrical roller bearing. These bearings have inner races 12, 22, and 32, outer races 14, 24, and 34, rolling elements 16, 26, and 36 and holders 18, 28, and 38 as major members, respectively. In general, high-carbon chrome bearing steel such as SUJ2 is used in the inner races 12, 22, and 32 and the outer races 14, 24, and 34, while high-carbon chrome bearing steel and ceramics are used in the rolling elements 16, 26, and 36. According to this embodiment, the raceways, namely the inner and outer races (12, 22, 32, and 14, 24, 34) contain the following alloy elements in steel, C: no less than 0.6% and not more than 1.3%; Si: no less than 0.3% and not more than 3.0%; Mn: no less than 0.2% and not more than 1.5%; P: at or less than 0.03%; S: at or less than 0.03%; Cr: no less than 0.3% and not more than 5.0%; Ni: no less than 0.1% and not more than 3.0%; Al: at or less than 0.050%; Ti: at or less than 0.003%; O: at or less than 0.0015%; and N: at or less than 0.015%, in order to improve wear-resistance and seizing-resistance. The rest of the steel is composed of Fe and unavoidable impurities. This steel is tempered after either quenching or carbonitriding, and presents a surface hardness of at least HRC 58 after tempering.

The above steel composition and the content of each element are described below in detail.

EXAMPLE

Examples of the present invention will be described hereinafter.

Steel of the chemical composition shown in Table 1 was melted with a vacuum induction furnace and molded into a 150 kg steel ingot. Later the steel ingot was held at 1200° C. for three hours and forged at a high temperature to provide a round bar with a 50 mm diameter. The round bar was held at 850° C. for one hour to normalize and then cooled in air. Further, the bar was held at 790° C. for six hours for a softening treatment to make machining easier, then cooled to 650° C. at a cooling rate of 10° C./hour, and further cooled down to room temperature in air for softening. Various tests were conducted on this heat-treated steel bar.

TABLE 1

| Species of Steel | Na | \multicolumn{13}{c}{Chemical composition (mass %)} |
|---|---|---|---|---|---|---|---|---|---|---|---|---|---|---|
| | | C | Si | Mn | P | S | Ni | Cr | Mo | V | Al | Ti | O | N |
| Examples of the invention | | | | | | | | | | | | | | |
| A | 1 | 0.81 | 2.01 | 0.50 | 0.018 | 0.020 | 0.53 | 1.49 | — | — | 0.021 | 0.0023 | 0.0010 | 0.009 |
| B | 2 | 1.01 | 0.75 | 0.45 | 0.019 | 0.020 | 1.01 | 1.51 | — | — | 0.020 | 0.0023 | 0.0011 | 0.011 |
| C | 3 | 0.80 | 2.51 | 0.44 | 0.017 | 0.022 | 0.55 | 1.48 | — | — | 0.022 | 0.0024 | 0.0013 | 0.010 |
| D | 4 | 1.21 | 1.01 | 0.35 | 0.018 | 0.019 | 0.78 | 1.49 | — | — | 0.020 | 0.0025 | 0.0010 | 0.011 |
| E | 5 | 1.05 | 1.51 | 0.40 | 0.019 | 0.017 | 2.01 | 1.50 | — | — | 0.021 | 0.0022 | 0.0009 | 0.008 |
| F | 6 | 1.01 | 1.49 | 0.45 | 0.016 | 0.021 | 1.51 | 1.51 | — | — | 0.021 | 0.0023 | 0.0010 | 0.009 |
| G | 7 | 1.20 | 1.01 | 0.25 | 0.018 | 0.020 | 0.79 | 1.50 | 0.24 | — | 0.021 | 0.0024 | 0.0011 | 0.011 |
| H | 8 | 1.01 | 0.51 | 0.45 | 0.019 | 0.021 | 2.51 | 1.51 | — | 0.41 | 0.022 | 0.0025 | 0.0010 | 0.010 |
| I | 9 | 1.00 | 0.52 | 0.46 | 0.020 | 0.020 | 1.51 | 1.52 | — | 0.85 | 0.021 | 0.0022 | 0.0009 | 0.011 |
| J | 10 | 1.00 | 1.48 | 1.10 | 0.018 | 0.020 | 1.52 | 1.48 | — | — | 0.022 | 0.0023 | 0.0011 | 0.009 |
| K | 11 | 1.21 | 1.00 | 0.45 | 0.019 | 0.019 | 2.51 | 2.51 | — | — | 0.020 | 0.0023 | 0.0012 | 0.010 |
| L | 12 | 1.01 | 0.50 | 0.35 | 0.017 | 0.021 | 0.79 | 4.51 | — | — | 0.021 | 0.0025 | 0.0011 | 0.010 |

TABLE 1-continued

| Species of Steel | Na | C | Si | Mn | P | S | Ni | Cr | Mo | V | Al | Ti | O | N |
|---|---|---|---|---|---|---|---|---|---|---|---|---|---|---|
| Comparative Examples | | | | | | | | | | | | | | |
| M | 13 | 1.01 | 0.25 | 0.50 | 0.020 | 0.020 | 0.02 | 1.50 | — | — | 0.020 | 0.0022 | 0.0009 | 0.009 |
| N | 14 | 1.22 | 0.22 | 0.45 | 0.019 | 0.019 | 0.02 | 1.49 | — | — | 0.021 | 0.0023 | 0.0010 | 0.010 |
| O | 15 | 1.00 | 1.51 | 0.45 | 0.019 | 0.019 | 0.03 | 1.48 | — | — | 0.021 | 0.0024 | 0.0011 | 0.011 |
| P | 16 | 1.23 | 1.01 | 0.35 | 0.017 | 0.018 | 0.02 | 1.51 | — | — | 0.020 | 0.0023 | 0.0011 | 0.010 |
| Q | 17 | 0.55 | 1.00 | 0.40 | 0.016 | 0.017 | 0.50 | 1.50 | 0.25 | — | 0.020 | 0.0022 | 0.0010 | 0.010 |
| R | 18 | 1.55 | 1.01 | 0.35 | 0.017 | 0.018 | 1.00 | 1.50 | — | 0.40 | 0.022 | 0.0023 | 0.0011 | 0.009 |
| S | 19 | 1.21 | 1.00 | 0.30 | 0.065 | 0.040 | 0.50 | 1.50 | — | — | 0.065 | 0.0522 | 0.0025 | 0.025 |
| T | 20 | 1.20 | 1.01 | 2.65 | 0.018 | 0.020 | 1.50 | 1.45 | — | — | 0.021 | 0.0021 | 0.0010 | 0.011 |
| U | 21 | 1.21 | 0.98 | 0.45 | 0.017 | 0.019 | 1.50 | 6.01 | — | — | 0.020 | 0.0021 | 0.0011 | 0.009 |
| V | 22 | 1.10 | 0.55 | 0.15 | 0.017 | 0.020 | 1.00 | 0.22 | 0.01 | 0.02 | 0.003 | 0.0020 | 0.0010 | 0.009 |
| W | 23 | 1.15 | 1.01 | 0.45 | 0.018 | 0.020 | 1.50 | 1.45 | 0.35 | — | 0.021 | 0.0022 | 0.0011 | 0.010 |
| X | 24 | 1.15 | 1.00 | 0.40 | 0.019 | 0.021 | 2.00 | 1.40 | — | 2.01 | 0.022 | 0.0021 | 0.0010 | 0.010 |
| Y | 25 | 1.21 | 4.01 | 0.55 | 0.019 | 0.019 | 1.00 | 1.40 | — | — | 0.020 | 0.0022 | 0.0010 | 0.009 |
| Z | 26 | 1.20 | 0.55 | 0.45 | 0.018 | 0.018 | 4.23 | 1.35 | — | — | 0.019 | 0.0020 | 0.0009 | 0.010 |

Hardness Test

A cylindrical test piece which was 20 mm in diameter and 100 mm in length was cut out from the steel bar 50 mm in diameter for the measurement of the tempering hardness after quenching and the tempering hardness after carbonitriding.

For quenching, the test piece was heated in a salt furnace, held at 850° C. for 30 minutes, and then quenched into oil at 80° C. Subsequently, the test piece was heated in the salt furnace again, held for two hours at 350° C. and then cooled in the air for tempering.

For carbonitriding, the test piece was held at 850° C. for 60 minutes in an atmosphere-controlled furnace used in usual commercial manufacturing in an RX atmosphere in which the carbon potential was controlled at 1.0–1.2% and $NH_3$ was contained 5–10%. Then the test piece was quenched into oil and tempered at 350° C. for 120 minutes.

From the center of the test piece that experienced the above quenching/tempering treatment or the test piece that experienced the above carbonitriding/tempering treatment, a 10 mm thick disk-shape test piece was cut out. Both sides of the test piece were wet-polished to provide a test piece for hardness measurement.

A Rockwell hardness-tester was employed for hardness measurement. The hardness of spots 2 mm below the surface of the test piece was measured and the values of seven measurement points were averaged to provide the tempering hardness.

Rolling Fatigue Life Test

In order to examine the performance of the bearing component, a thrust-type rolling fatigue life tester was employed and the life of each material was evaluated.

A ring test piece, which was 47 mm in outer diameter, 29 mm in inner diameter and 7 mm in thickness, was cut out from the 50 mm-diameter round bar by machining and was coarse-worked for the life evaluation test using the thrust-type rolling fatigue life tester.

Quenching/tempering treatment and carbonitriding were applied to the test pieces that had been coarse-worked. These heat treatments were conducted in a commercial furnace used in daily manufacturing.

The quenching/tempering treatment was conducted in an atmosphere-controlled furnace which provided an RX gas atmosphere. The test pieces were held at 850° C. for 30 minutes under a carbon potential controlled not to cause decarbonization or carbonization based on the carbon content of each test piece. Then the test pieces were quenched in oil and tempered at 350° C. for 120 minutes.

The heat treatment of carbonitrided test pieces was conducted under the same conditions as the above.

Both sides of each test piece were mirror-polished after the heat treatment. The polishing margin of the carbonitrided test pieces was 0.1 mm on both sides.

A thrust-type rolling fatigue life tester was employed in the rolling fatigue life test. Table 2 shows the test conditions of the test. The life test was conducted at room temperature and 200° C. In addition, the life test was conducted under a condition simulating rotation with the existence of foreign materials.

TABLE 2

| Test conditions of Rolling fatigue life | |
|---|---|
| Tester | Thrust-type rolling fatigue life tester |
| Contact face pressure | 5.0 GPa |
| Rotation speed | 2000 rpm |
| Test temperature | Room temperature, 200° C. |
| Lubrication | turbo oil |
| Amount of foreign materials | 0.4 g/1000 cc |

The fatigue test was repeated 15 times with the same condition. The time to reach an accumulated damage probability of 10% in a Weibull distribution was taken as the life of the test piece. The material in comparative example No.13 in Table 2 is SUJ2 and the life of this material that had experienced quenching/tempering treatment was set at 1.0 when describing the life of each material. Carbide For the measurement of carbides in steel, the test piece that would serve in the life test using the thrust-type rolling fatigue life tester was employed. The sample piece for microscopic observation was prepared by cutting transversely the ring of the test piece that was machined and heat-treated to serve in the thrust-type rolling fatigue life test. The sample piece was mirror-polished and etched with a picral etchant for the microscopic observation of carbides. The face 0.1 mm below the roller surface was observed by microscopy for carbides and the size of the largest carbide particle was measured within an observation area of 50 $mm^2$.

Table 3 shows the measurement results of the above 350° C. tempering hardness, rolling fatigue life at room temperature and 200° C. rolling fatigue life under the existence of foreign materials and maximum carbide size in the case of the present invention. Table 4 shows the corresponding results of the comparative examples.

TABLE 3

Example of the invention

| No. | Species of steel | Treatment | 350° C. tempering hardness (HRC) | Maximum carbide size (μm) | Ratio of rolling fatigue life at room temperature | Ratio of rolling fatigue life at 200° C. | Ratio of rolling fatigue life under existence of foreign materials At room temperature | 200° C. |
|---|---|---|---|---|---|---|---|---|
| 1 | A | HT | 58.8 | 2.5 | 3.2 | 4.0 | 3.6 | 4.3 |
|   |   | Carbonitriding | 59.3 | 3.3 | 3.5 | 4.8 | 4.1 | 5.5 |
| 2 | B | HT | 59.4 | 3.5 | 4.5 | 6.9 | 4.8 | 7.3 |
|   |   | Carbonitriding | 59.8 | 3.7 | 4.7 | 7.8 | 5.2 | 8.4 |
| 3 | C | HT | 58.8 | 2.5 | 3.1 | 5.1 | 3.4 | 5.3 |
|   |   | Carbonitriding | 60.0 | 2.9 | 3.5 | 5.8 | 4.0 | 6.3 |
| 4 | D | HT | 60.5 | 2.6 | 10.1 | 14.0 | 10.4 | 14.2 |
|   |   | Carbonitriding | 61.1 | 3.1 | 10.7 | 15.2 | 11.3 | 15.7 |
| 5 | E | HT | 59.9 | 3.3 | 5.1 | 8.1 | 5.4 | 8.3 |
|   |   | Carbonitriding | 59.3 | 3.9 | 7.0 | 10.2 | 7.7 | 10.8 |
| 6 | F | HT | 60.0 | 3.2 | 6.1 | 9.5 | 6.3 | 9.9 |
|   |   | Carbonitriding | 60.7 | 4.0 | 8.5 | 11.1 | 8.9 | 11.6 |
| 7 | G | HT | 60.7 | 3.5 | 7.3 | 11.1 | 7.7 | 11.4 |
|   |   | Carbonitriding | 61.5 | 4.7 | 7.9 | 13.2 | 8.5 | 13.8 |
| 8 | H | HT | 59.8 | 2.7 | 4.0 | 7.6 | 4.3 | 7.9 |
|   |   | Carbonitriding | 59.0 | 3.5 | 7.0 | 9.5 | 7.5 | 10.0 |
| 9 | I | HT | 59.5 | 3.2 | 4.5 | 8.7 | 4.9 | 9.1 |
|   |   | Carbonitriding | 60.1 | 4.0 | 6.5 | 10.0 | 7.1 | 10.5 |
| 10 | J | HT | 59.6 | 4.2 | 5.2 | 9.1 | 5.4 | 9.3 |
|   |   | Carbonitriding | 59.9 | 5.0 | 7.3 | 9.4 | 7.8 | 10.0 |
| 11 | K | HT | 60.5 | 6.1 | 9.4 | 13.5 | 9.7 | 13.8 |
|   |   | Carbonitriding | 60.0 | 6.7 | 7.5 | 10.3 | 8.0 | 10.8 |
| 12 | L | HT | 59.8 | 6.8 | 6.4 | 9.6 | 6.7 | 9.8 |
|   |   | Carbonitriding | 61.1 | 7.5 | 4.2 | 6.5 | 4.7 | 7.0 |

TABLE 4

Example of the invention

| No. | Species of steel | Treatment | 350° C. tempering hardness (HRC) | Maximum carbide size (μm) | Ratio of rolling fatigue life at room temperature | Ratio of rolling fatigue life at 200° C. | Ratio of rolling fatigue life under existence of foreign materials At room temperature | 200° C. |
|---|---|---|---|---|---|---|---|---|
| 13 | M | HT | 55.6 | 1.1 | 1.0 | 1.0 | 1.0 | 1.0 |
|    |   | Carbonitriding | 57.2 | 2.8 | 1.8 | 1.4 | 2.0 | 1.7 |
| 14 | N | HT | 56.0 | 2.5 | 1.1 | 1.3 | 1.1 | 1.2 |
|    |   | Carbonitriding | 57.3 | 4.2 | 1.9 | 1.7 | 2.2 | 1.9 |
| 15 | O | HT | 60.1 | 2.8 | 2.1 | 2.5 | 2.0 | 2.5 |
|    |   | Carbonitriding | 60.3 | 4.3 | 2.2 | 2.8 | 2.6 | 3.1 |
| 16 | P | HT | 60.1 | 3.0 | 2.2 | 2.1 | 2.0 | 1.9 |
|    |   | Carbonitriding | 60.8 | 4.2 | 3.0 | 2.8 | 3.3 | 3.2 |
| 17 | Q | HT | 53.0 | 2.5 | 0.4 | 0.7 | 0.3 | 0.6 |
|    |   | Carbonitriding | 54.3 | 2.3 | 0.5 | 1.1 | 0.9 | 1.4 |
| 18 | R | HT | 54.2 | 6.5 | 1.6 | 1.4 | 1.9 | 1.5 |
|    |   | Carbonitriding | 61.5 | 9.2 | 0.9 | 1.0 | 1.0 | 1.2 |
| 19 | S | HT | 59.4 | 4.4 | 1.4 | 2.0 | 1.4 | 1.7 |
|    |   | Carbonitriding | 60.3 | 5.1 | 2.4 | 2.4 | 2.5 | 2.6 |
| 20 | T | HT | 59.4 | 7.7 | 1.9 | 1.5 | 1.9 | 1.3 |
|    |   | Carbonitriding | 59.9 | 8.5 | 1.7 | 1.7 | 1.9 | 1.8 |
| 21 | U | HT | 62.5 | 17.0 | 1.4 | 1.1 | 1.2 | 0.9 |
|    |   | Carbonitriding | 63.0 | 29.0 | 0.8 | 0.8 | 0.9 | 1.1 |
| 22 | V | HT | 56.5 | 3.8 | 0.7 | 0.3 | 0.4 | 0.6 |
|    |   | Carbonitriding | 57.7 | 3.7 | 0.8 | 0.6 | 0.9 | 0.5 |
| 23 | W | HT | 59.4 | 3.0 | 1.3 | 1.5 | 1.1 | 1.3 |
|    |   | Carbonitriding | 60.0 | 3.4 | 2.2 | 2.2 | 2.3 | 2.3 |
| 24 | X | HT | 61.5 | 2.4 | 2.0 | 2.5 | 1.9 | 2.1 |
|    |   | Carbonitriding | 62.0 | 3.3 | 2.2 | 2.7 | 2.3 | 2.9 |

TABLE 4-continued

Example of the invention

| No. | Species of steel | Treatment | 350° C. tempering hardness (HRC) | Maximum carbide size (μm) | Ratio of rolling fatigue life at room temperature | Ratio of rolling fatigue life at 200° C. | Ratio of rolling fatigue life under existence of foreign materials | |
|---|---|---|---|---|---|---|---|---|
| | | | | | | | At room temperature | 200° C. |
| 25 | Y | HT | 62.5 | 1.4 | 2.3 | 2.7 | 2.3 | 2.9 |
| | | Carbonitriding | 62.6 | 2.7 | 2.3 | 2.9 | 2.7 | 3.0 |
| 26 | Z | HT | 62.4 | 1.5 | 2.4 | 2.6 | 2.3 | 2.8 |
| | | Carbonitriding | 62.3 | 2.5 | 2.1 | 2.9 | 2.6 | 2.9 |

The test results described in Tables 3 and 4 indicate that the steel of the composition according to the present invention has a hardness, HRC 58 or higher, even after tempering at 350° C. Besides, the steel according to the invention presents a longer rolling fatigue life at room temperature and 200° C. as well as under the existence of foreign materials even after it experienced a simple quenching/tempering treatment (HT), compared with the steel in the comparative examples. It has also been found that the steel of the composition according to the invention presents an excellent rolling fatigue life even if replacing the quenching/tempering treatment by carbonitriding. In addition, the carbide particle existing 0.1 mm below the roller surface is 8.0 μm at the maximum.

Figure 3A:
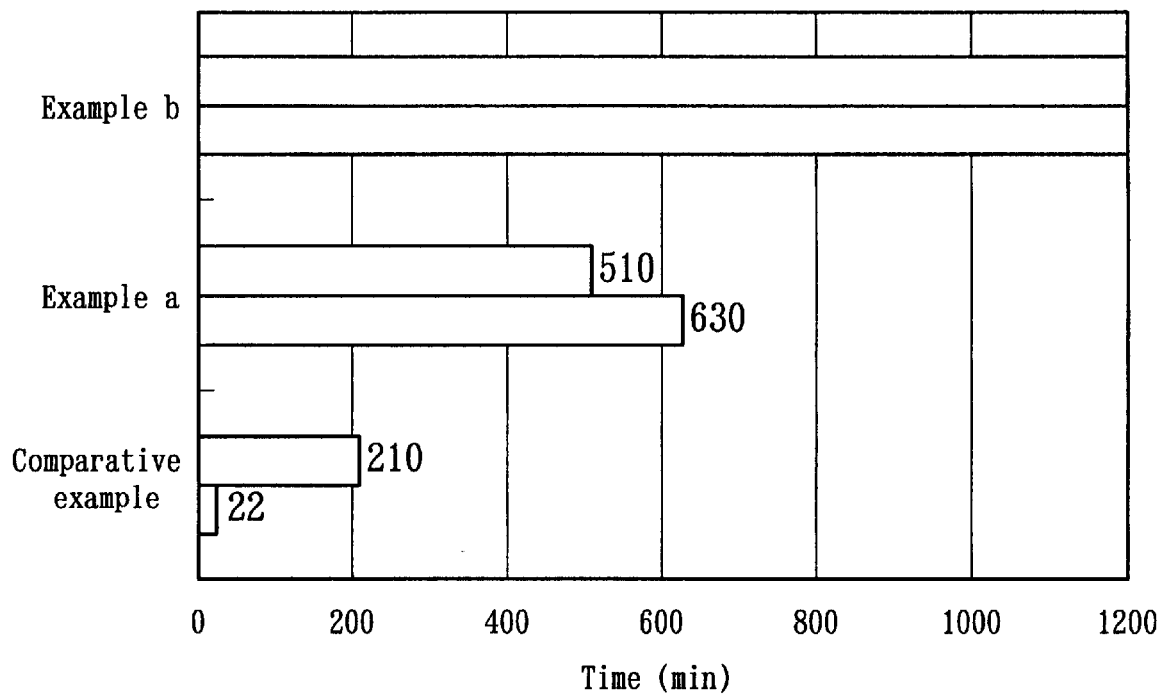
FIG. 3A is a bar graph illustrating the results of seizing-resistance tests on the steel according to the present invention.
Figure 3B:
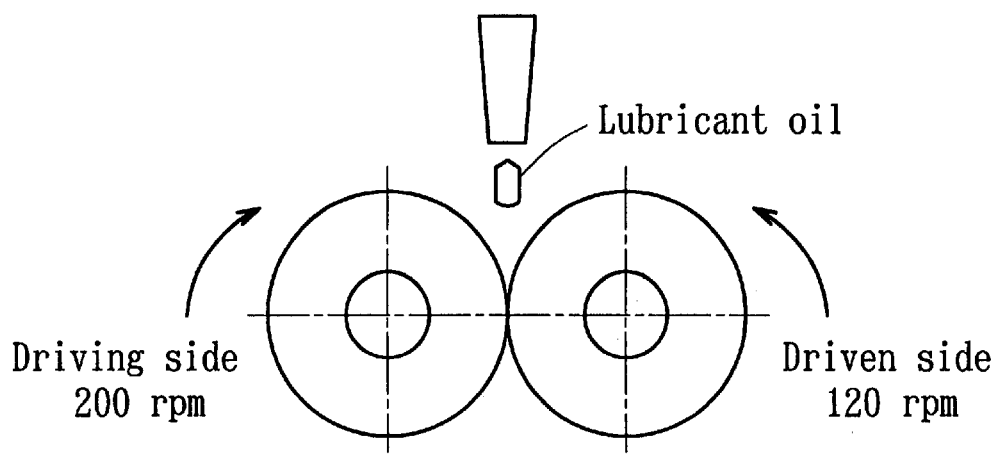
FIG. 3B is a schematic diagram of a seizing-resistance tester.

Next, a double cylindrical roller test was conducted for evaluating a seizing-resistance of the test pieces. FIG. 3A shows the test results and FIG. 3B shows the schematic structure of the tester. The test was performed using a rotary test piece 40 mm in diameter and under the condition that the contacting face pressure was 2900 MPa at the maximum. The test pieces employed were made of steel used in example a (corresponding to No.4 in Table 1), example b (the test piece of example 1 was carbonitrided), and comparative example (SUJ2). In this test, the test piece is determined to have caused seizing when the torque reaches a predetermined value. In the comparative example, seizing took place in 22 minutes and 210 minutes. On the other hand, in the example a, seizing was recognized in as long as 510 minutes and 630 minutes, while in the example b, seizing was not recognized in even 1200 minutes.

Figure 4A:
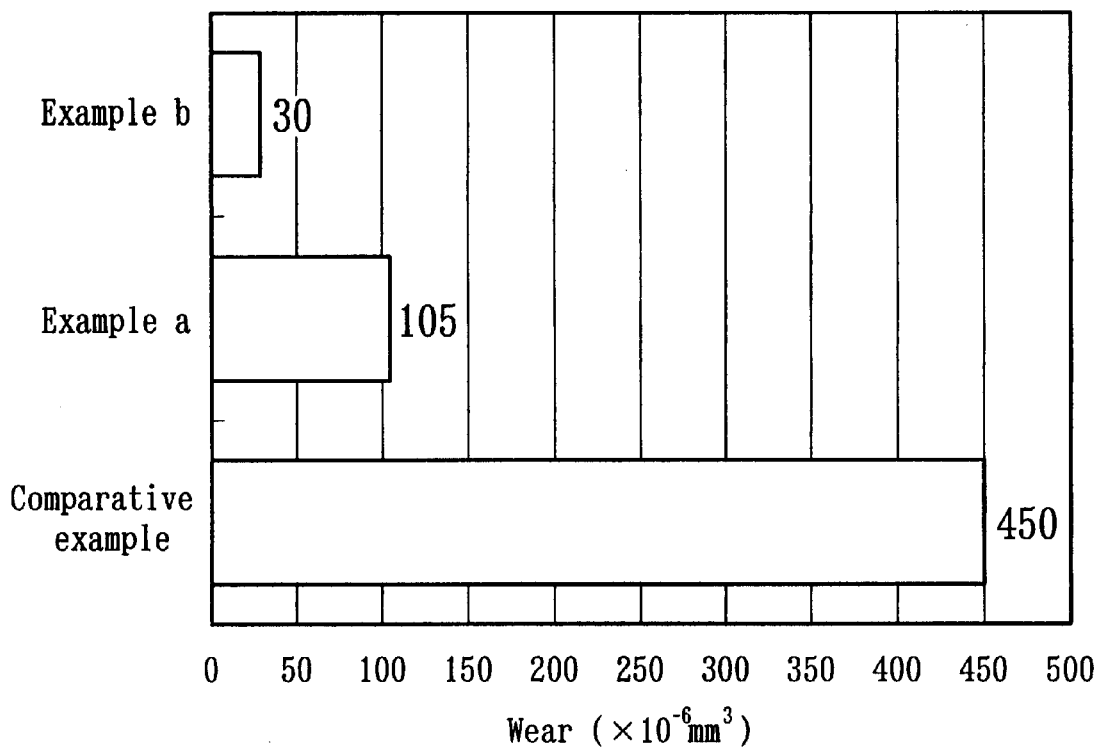
FIG. 4A is a bar graph illustrating the results of wear-resistance tests on the steel according to the present invention.
Figure 4B:
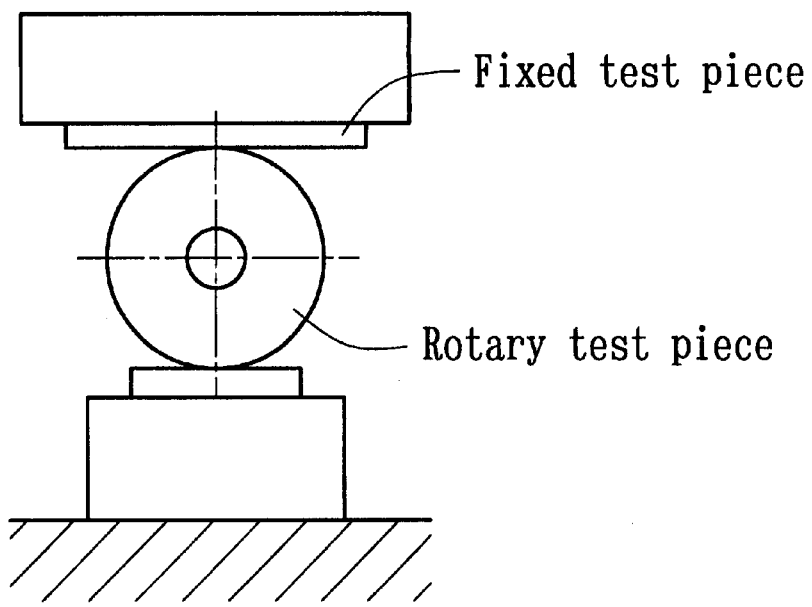
FIG. 4B is a schematic diagram of a wear-resistance tester.

In order to evaluate the wear-resistance of the same test pieces as the above, the amount of wear was measured by pressing a rotary cylinder onto the test piece, using a tester of which a schematic structure is demonstrated in FIG. 4B. FIG. 4A illustrates the test results. Compared with the wear observed in the test pieces according to the comparative examples, the wear was slightly smaller than ¼ in the example a and 1/10 or less in the example b in the present invention. The test was conducted under the condition that the rotary test piece was 40 mm in diameter, its rotation speed 4775 rpm, maximum pressure on the contact surface 200 MPa and test time 10 min.

The above results indicate that the bearing steel according to the present invention shows better performance than that of the prior art in the evaluations of both seizing-resistance and wear-resistance in examples a and b.

Figure 5A:
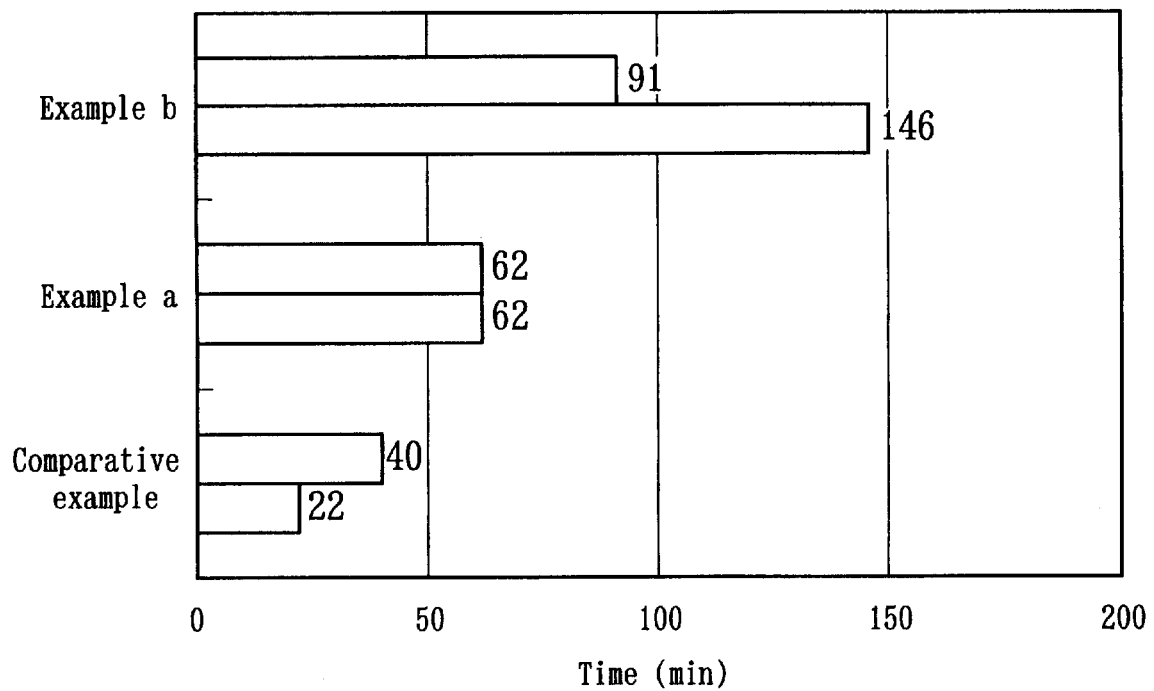
FIG. 5A is a bar graph illustrating the results of seizing-resistance tests on the steel according to the present invention.
Figure 5B:
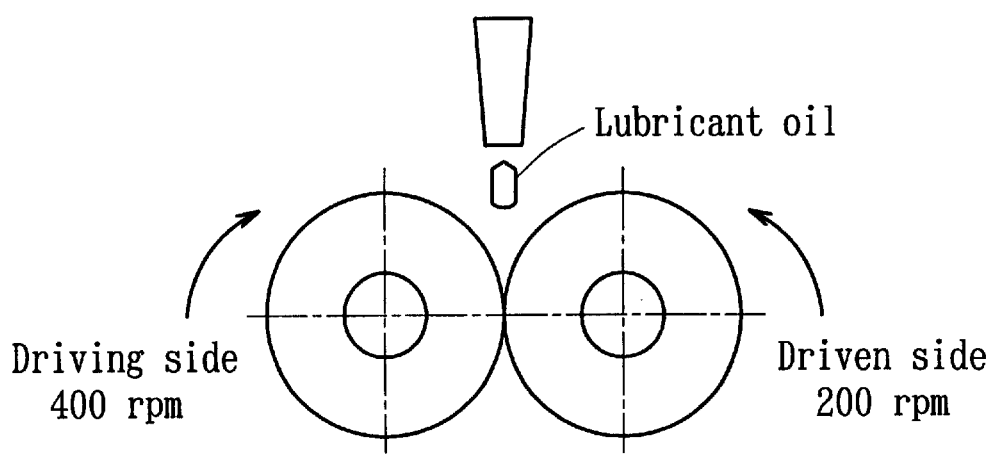
FIG. 5B is a schematic diagram of the seizing-resistance tester.
Figure 6A:
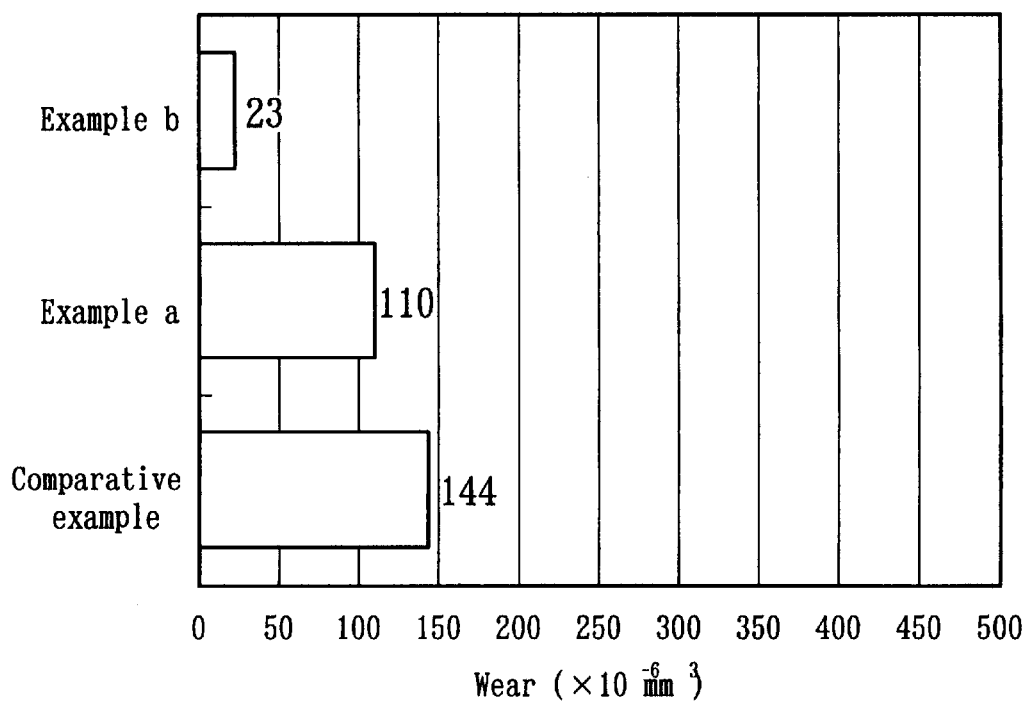
FIG. 6A is a bar graph illustrating the results of wear-resistance tests on the steel according to the present invention.
Figure 6B:
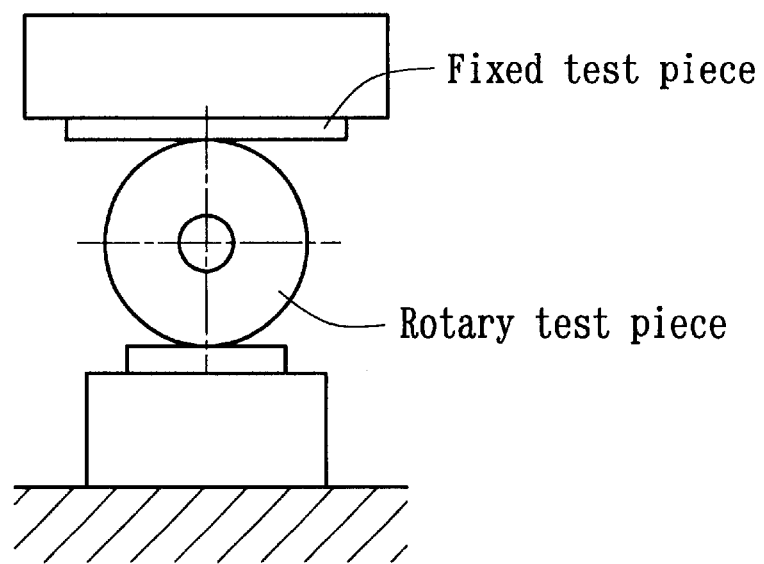
FIG. 6B is a schematic diagram of the wear-resistance tester.

Ceramic rolling elements may be employed in the bearing for use in the main spindle of a machine tool, when a high-speed rotation is required. FIGS. 5 and 6 show the test results in the case in which a ceramic material was employed as the counterpart material in the above two types of test. It is evident that examples a and b show better results than the comparative examples. The test was conducted in the case of FIG. 5 under the conditions that the rotary test piece was 40 mm in diameter and a maximum pressure on the contact surface was 3400 MPa; the rotary test piece was 40 mm in diameter, its rotation speed was 4775 rpm, a maximum pressure on the contact surface was 200 MPa and a test time was 10 min in FIG. 6.

As described above, it becomes possible in the present invention to provide steel of excellent rolling fatigue resistance and surface damage resistance, since the best alloy elements and contents have been found. As a result, the durability and reliability of roller bearings for use in the main spindle of a machine tool can be improved.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A bearing for use in a main spindle of a machine tool, wherein at least a raceway of said bearing is made of steel comprising alloy elements by mass:

C: no less than 0.6% and not more than 1.3%;
Si: no less than 0.5% and not more than 3.0%;
Mn: no less than 0.2% and not more than 1.5%;
P: no less than 0.016% and no more than 0.03%;
S: no less than 0.017% and no more than 0.03%;
Cr: no less than 0.3% and not more than 5.0%;
Ni: no less than 0.5% and not more than 3.0%;
Al: no less than 0.020% and no more than 0.050%;
Ti: no less than 0.0022% and no more than 0.003%;
O: no less than 0.0009% and no more than 0.0015%;
N: no less than 0.008% and no more than 0.015%;
Fe and unavoidable impurities, and
wherein said raceway is tempered after either quenching or carbonitriding and its surface hardness presents at least HRC 58 after tempering.

2. The bearing according to claim 1, wherein said raceway has a carbonitrided surface layer containing at least 10% by volume of residual austenite.

3. The bearing according to claim 1, wherein said bearing is an angular contact ball bearing.

4. The bearing according to claim 1, wherein said bearing is a cylindrical roller bearing.

5. The bearing according to claim 2, wherein said bearing is an angular contact ball bearing.

6. The bearing according to claim 2, wherein said bearing is a cylindrical roller bearing.

7. The bearing according to claim 1, wherein said steel further comprises at least either 0.05 to less than 0.25% by mass of Mo or 0.05–1.0% by mass of V.

8. The bearing according to claim 7, wherein said raceway has a carbonitrided surface layer containing at least 10% by volume of residual austenite.

9. The bearing according to claim 7, wherein bearing is an angular contact ball bearing.

10. The bearing according to claim 7, wherein said bearing is a cylindrical roller bearing.

11. The bearing according to claim 8, wherein said bearing is an angular contact ball bearing.

12. The bearing according to claim 8, wherein said bearing is a cylindrical roller bearing.

* * * * *